INVENTOR
EDWARD D. DOWLING
BY G. H. Palmer
Ernest Cheslow
ATTORNEYS

Sept. 2, 1958 E. D. DOWLING 2,850,364
PLUG TYPE CATALYST CONTROL VALVE FOR ORTHOFLOW SYSTEM
Filed Feb. 8, 1954 3 Sheets-Sheet 2
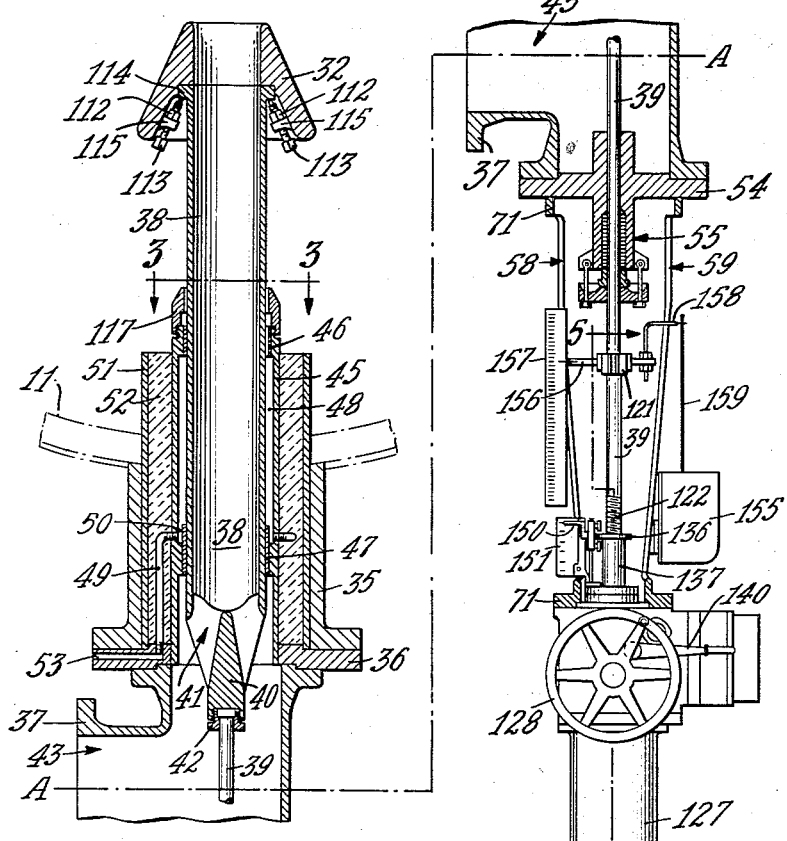
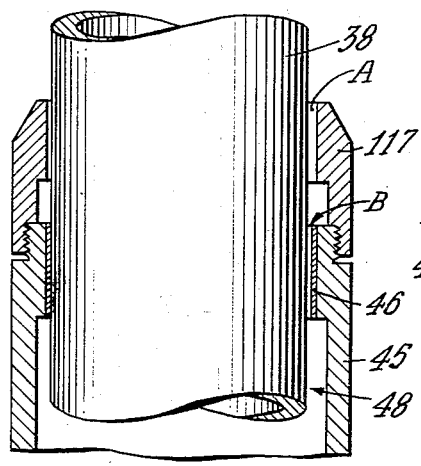
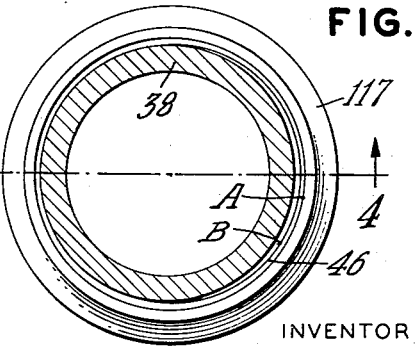
INVENTOR
EDWARD D. DOWLING
BY G. H. Palmer
Ernest Cheslow
ATTORNEYS Sept. 2, 1958     E. D. DOWLING     2,850,364
PLUG TYPE CATALYST CONTROL VALVE FOR ORTHOFLOW SYSTEM
Filed Feb. 8, 1954     3 Sheets-Sheet 3
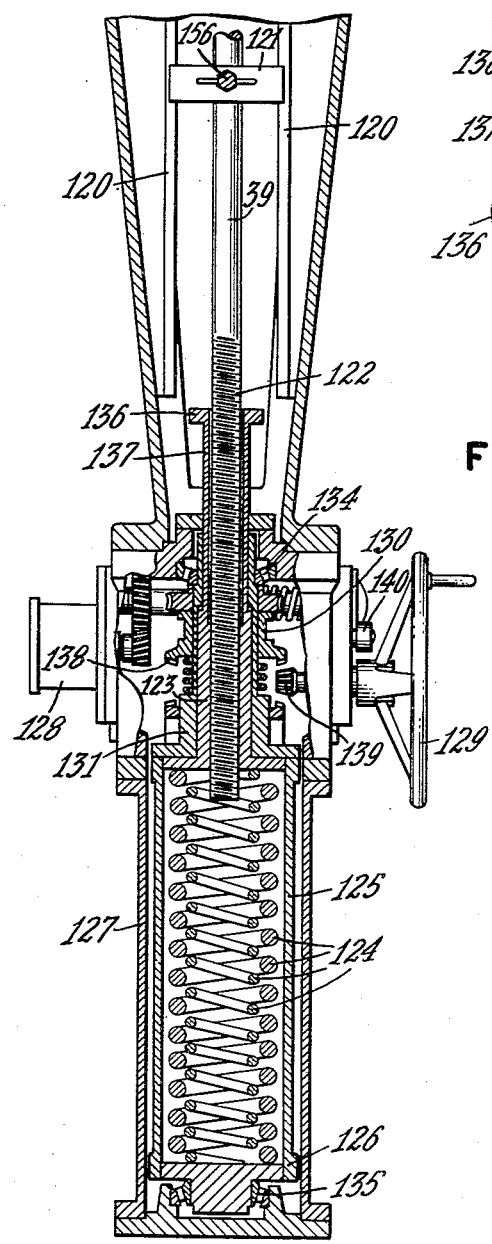
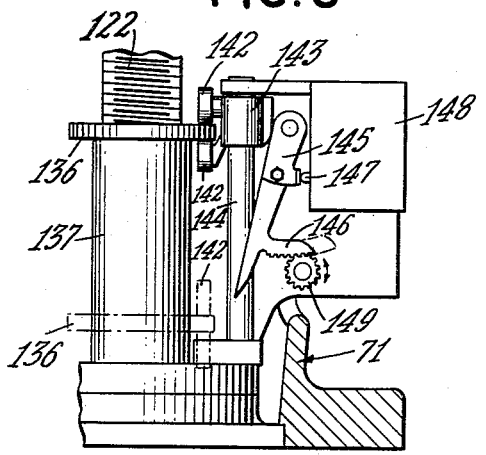
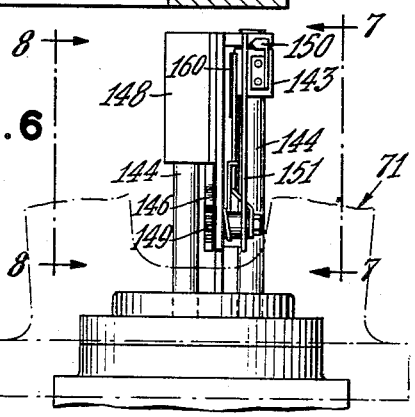
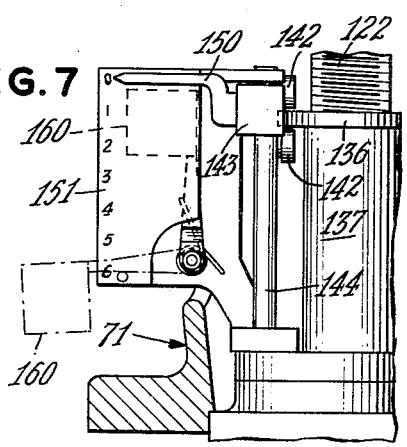
INVENTOR
EDWARD D. DOWLING
BY E. H. Palmer
Ernest Cheslow
ATTORNEYS

United States Patent Office 2,850,364
Patented Sept. 2, 1958

2,850,364

PLUG TYPE CATALYST CONTROL VALVE FOR ORTHOFLOW SYSTEM

Edward D. Dowling, Queens Village, N. Y., assignor to The M. W. Kellogg Company, Jersey City, N. J., a corporation of Delaware Application February 8, 1954, Serial No. 408,859

12 Claims. (Cl. 23—288)

This invention relates to a control valve, and particularly to a plug type control valve for controlling the flow of fluids or fluidized materials through a conduit, such as the powdered catalyst transfer lines and flue gas vent stacks employed in fluid catalytic cracking systems and in fluid catalytic hydroforming systems in the petroleum refining art.

While the invention is capable of various applications involving high temperature operations in the chemical processing and petroleum refining arts, it will be referred to and explained in the following description as being particularly applied to a converter, such as a fluid catalytic cracking unit or a fluid catalytic hydroforming unit of conventional design, having superimposed contact chambers in which the catalyst is maintained in a state of phase separation comprising an upper diffuse phase and a lower dense pseudo-liquid phase, the catalyst being withdrawn from the lower dense phase of the upper chamber through a vertical internal standpipe and discharged at a low point within the dense phase of the lower chamber and, after suitable treatment in the lower chamber, being returned upwardly through an internal vertical carrier line to the dense phase of the upper chamber.

In systems of this type a continuous cycle flow of catalyst between the chambers is obtained by passing catalyst by gravity flow from the upper chamber to the lower chamber through a standpipe and passing the catalyst from the lower chamber to the upper chamber through a carrier line by injection thereinto a stream of the gas to be contacted in the upper chamber, the continuous flow of the mixture upwardly through the carrier line resulting from the fact that the gas and catalyst form a mixture of lower particle concentration within the carrier line than is present in the dense bed of the catalyst in the lower chamber. In those cases where a regeneration zone is superimposed upon a conversion zone, the gas introduced into the carrier line is ordinarily air or other oxygen-containing gas. In those cases where the conversion zone is superimposed upon the regeneration zone the gas introduced into the carrier line is a stream of vaporous hydrocarbons.

Suitable flow control of catalyst from the standpipe into the dense phase of the lower chamber and from the latter into the carrier line for conveyance into the upper chamber is obtained by the use of plug valves engageable with the lower ends of the transfer lines and having elongated valve stems extending through the vessel wall controlled in their longitudinal movement by external mechanical or manual operating means.

Because of the extreme length of the vessels or chambers employed in carrying out such chemical conversions, the long standpipes and carrier lines required to transfer the catalyst from one chamber to another are subject to considerable expansion and contraction under the extreme temperatures normally employed. The problem of pipeline expansion must be considered, therefore, since it is not unusual for an expansion of from about 3" to a foot or more to occur in the internal transfer pipelines between the extreme position at starting up temperature and the position attained when the chamber is at the desired operating temperature.

To avoid undue stressing or buckling of the transfer lines, the vessel walls, and the valve mechanism, under all conditions of operation, various expedients have heretofore been employed to permit outward movement or release of the valve when thermal expansion of the transfer line occurs while the valve member is in its closed position, as where the chamber is brought up to operating temperature conditions with the plug valves inadvertently closed or not sufficiently retracted.

In the aforementioned prior copending application of Harold Kershaw and Edward D. Dowling, application Serial No. 61,622, filed November 23, 1948, and now Patent No. 2,668,755, issued February 9, 1954, of which this application is a continuation-in-part, there is disclosed a means for compensating for the thermal expansion in the transfer line which comprises a series of preloaded compression springs designed to permit expansion of the carrier line by their further compression. Specifically, said Patent No. 2,668,755 discloses a series of precompressed coil springs located outside of the valve housing. In actual construction it has been found more advantageous to utilize a set of heavy compensating springs, axially mounted about and concentric with the valve stem and located within the integral housing of the overall valve mechanism.

As an operating mechanism for reciprocating the plug type valve to permit the desired flow control, said Patent No. 2,668,755 discloses specifically a double acting hydraulic cylinder.

In actual practice it has been found that a conventional motor driven mechanical operator is preferable to a hydraulic cylinder for the following reasons:

(1) An auxiliary manual control for a hydraulic operator must be in tandem arrangement, which makes the entire valve and valve stem excessively long. It becomes necessary to eliminate even small deflections of this long stem to minimize binding. It also becomes necessary to install a by-pass around the piston. The entire arrangement becomes very bulky and heavy and requires expensive installation.

(2) Relatively large forces are required to operate the valve. If these forces are obtained by a high hydraulic pressure, there is likely to be trouble in the stuffing boxes. If they are obtained by lower pressures, a large diameter operating cylinder is required.

(3) The attendant piping system for a hydraulic operator is cumbersome. Even small leaks are a serious source of trouble.

(4) In spite of all precautions, residual dirt and sediment gets into the hydraulic system, causing the small passage in the positioner to become plugged.

(5) Cold weather operation must be provided for. This is done by circulating a fluid of lesser viscosity. This in turn has a tendency to speed up operation to an undesirable degree at normal temperatures.

(6) Vigorous steps must be taken to eliminate every trace of atmospheric moisture from the system; otherwise, water condenses in it and the hydraulic fluid becomes emulsified. Rusting follows, and then clogging of the positioner.

For the above reasons, the valve mechanism described in said Patent No. 2,668,755 has been adapted to the use of a conventional motor-driven mechanical operator in actual recent installations.

One disadvantage in the valve mechanism described in said Patent No. 2,668,755, as adapted to the use of a conventional mechanical operator, is in its failure to act as a means for sealing off one reaction zone from another, as in the case of complete shutdown. When the plug type valve of said Patent No. 2,668,755 is raised to seat against the lower portion of the transfer line at operating temperatures, it temporarily seals off the reaction zone from the regeneration zone. However, if the valve is seated without pressure on the compensating springs over and above the preset compression, the contraction of the transfer line as the temperature within the reactor drops will cause the head of the plug type valve to come out of contact with the bottom of the transfer line and thereby open the communication between the reaction zone and the regeneration zone. As a result of these disadvantages, it is considered advantageous, from an overall design point of view, to use a commercial mechanical operator of the gear box type to actuate the reciprocation of the plug type valve.

The present invention is in the nature of an improvement in the plug type valve assembly whereby the mechanically operated valve may be used for complete shutoff, regardless of the temperature changes involved.

A principal object of the invention is to provide a unitary plug type control valve which may be used to seal off one reaction zone from another at elevated temperatures and remain sealed at lower temperatures.

Another object of this invention is to provide a mechanically operated unitary plug type control valve for the end of a powder transfer line within a chamber, adapted to readily accommodate thermal expansion in the line accompanying a temperature rise while the valve is in its closed position and adapted to be continuously operated by its mechanical operator to accommodate thermal contraction in the line accompanying a temperature fall while the valve is maintained in its closed position.

Still another object is to provide a mechanically operated unitary plug type control valve having a hollow stem through which a feed stream of fluid material to be treated may be continuously injected from an external source into the end of the transfer line, the valve being so constructed that movement of the valve member between its extreme positions may be effected without causing any substantial stressing or movement of the line connections for supplying the fluid material to the hollow stem of the valve.

A further object is to provide a mechanically operated unitary plug type control valve for the end of a powder transfer line within a chamber, adapted while in its closed position to accommodate thermal expansion in the line, and adapted to maintain its closed position to accommodate thermal contraction in the line, and having a hollow stem extending through the chamber wall connected to a source of fluid material and to an external operating mechanism for controlling the movement of said valve, the construction being such as to require a minimum of effort for movement of the valve member.

Another object is to provide a unitary plug type control valve for the end of a powder transfer line within a chamber having its body portion rigidly secured to the transfer line and extending to a point outside the chamber, and its valve member adapted to accommodate thermal expansion while in its closed position, and adapted to maintain its closed position to accommodate thermal contraction.

Still another object is to provide a unitary plug type control valve for controlling the flow of fluid from a chamber into a conduit, in which the movable valve element is controlled externally of the chamber and is adapted to accommodate thermal expansion in the valve stem occurring while the valve is in closed position, and adapted to maintain its closed position to accommodate thermal contraction.

Other objects will be apparent from consideration of the following description taken in connection with the accompanying drawings forming a part of this application, in which:

Fig. 1 is a fragmentary elevation, in partial section, showing the valves of the present invention applied to a chamber or vessel which may be considered to be part of a typical fluid catalytic cracking unit comprising an upper reaction chamber and a lower regeneration chamber connected by internal transfer lines terminating in the lower portion of the lower chamber, portions of the unit not directly cooperating with the valve members being omitted for the sake of clarity, since they form no part of the present invention.

Figure 2 is an enlarged sectional view along plane 2—2 of Figure 1.

Figure 3 is a further enlarged sectional view along plane 3—3 of Figure 2.

Figure 4 is an enlarged sectional view along plane 4—4 of Figure 3.

Figure 5 is an enlarged sectional view of the lower portion of the valve along plane 5—5 of Figure 2.

Figure 6 is an enlarged front detail of the compensating spring indicator and closure control.

Figure 7 is an enlarged detail of the right view of the compensating spring indicator and closure control.

Figure 8 is an enlarged detail of the left view of the compensating spring indicator and closure control.

Figure 1:
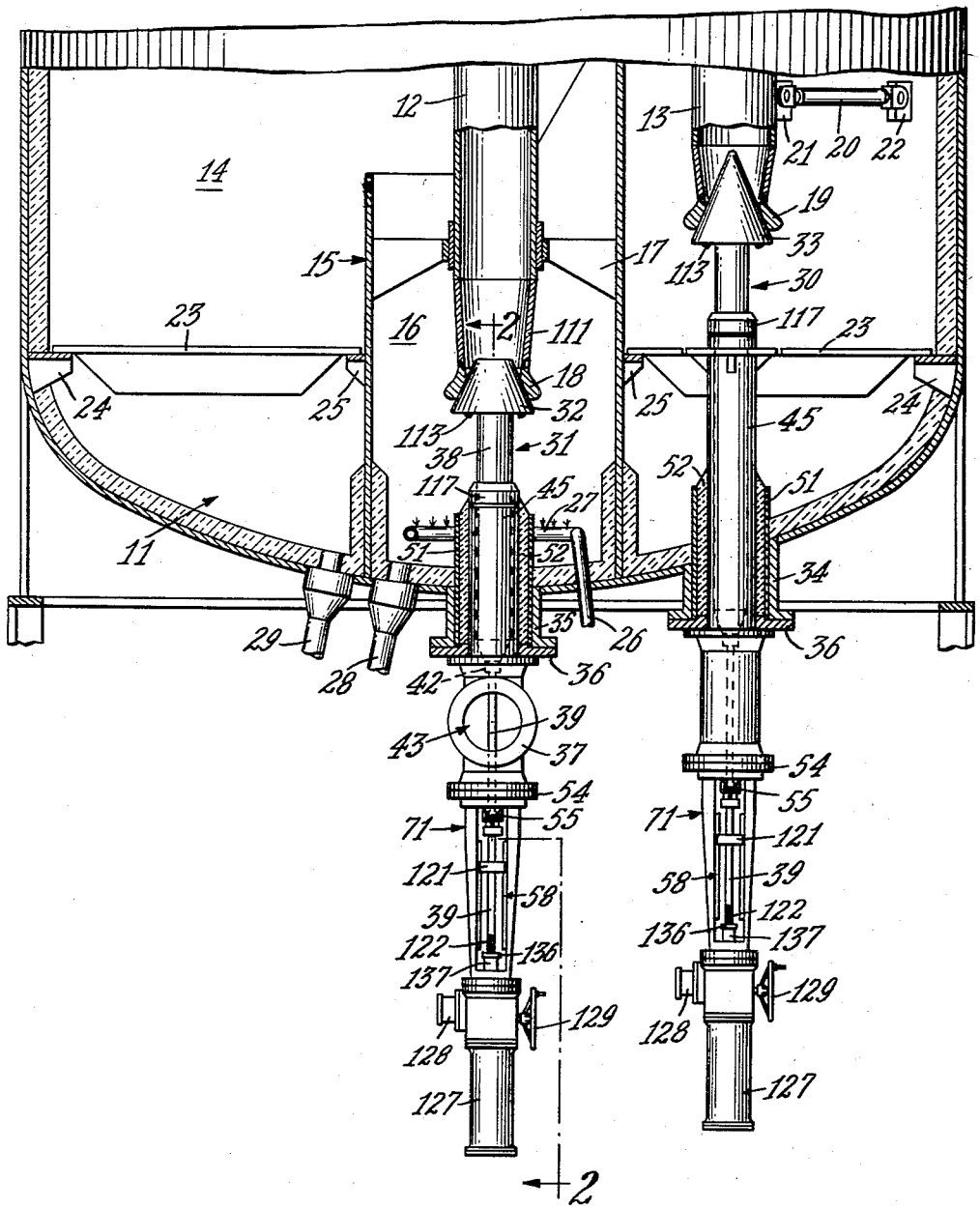

Referring to the drawings, there is shown in Figure 1, in fragmentary section the lower portion of a chamber 11, which may be the lower of two separate superimposed vessels or the lower subdivision of a single vessel suitably partitioned to form upper and lower chambers, such as that disclosed in U. S. Patent No. 2,630,352, granted on application Serial No. 724,956, filed January 29, 1947. For the purposes of illustrating an application of the present invention it may be assumed that the chamber 11 represents the lower rengeneration chamber of a fluid catalytic hydroforming unit having a superimposed reaction chamber. Vertical conduits 12 and 13 serve as lines of communication between a dense fluidized mass of catalyst maintained in the bottom of the upper reaction chamber and a similar mass 14 maintained in the lower portion of the regeneration chamber. Conduit 12 is a carrier line for conveying fresh regenerated catalyst from the dense fluidized catalyst mass 14 maintained in the lower portion of the chamber 11 upwardly into the reaction chamber above, and conduit 13 is a standpipe for withdrawing spent catalyst from the dense bed maintained in the lower portion of the upper reaction chamber and discharging it into the catalyst bed or dense phase 14 of the regenerator.

Since a superimposed arrangement of reaction and regeneration chambers in a fluid catalytic conversion unit is well known, a fuller illustration and description is not believed necessary for a complete understanding of the present invention.

The carrier line 12 and the standpipe 13 are elongated conduits extending upwardly through the regeneration zone in chamber 11 and are, therefore, subject to considerable expansion and contraction between the extremes of temperature obtained when the regenerator is brought from a cold condition up to operating temperature conditions which may be in the order of about 1000 to 1100° F., or vice versa.

A cylindrical member 15 centrally positioned in the bottom of the chamber 11 forms a well 16 into which the lower end of the regenerated catalyst carrier line 12 extends. Suitable guide members 17 attached to the inner wall of the cylinder 15 serve to maintain the lower end of the carrier line 12 centrally positioned within the well without restricting its free longitudinal movement by reason of expansion or contraction as a result of temperature changes within the regenerator. The lower end of carrier line 12 is provided with a transition casting 111, generally frusto conical, which adjusts the cross-sectional area to the port size required. A removable valve seat 18, generally flared, is attached to the lower portion of the transition casting to provide a seat for the plug type valve. Valve seat 18 is generally made of a hardened material in order to resist erosion, but is, nevertheless, removable, so that it may be easily replaced as a relatively small unit.

The lower end of standpipe 13 terminates below the upper edge of the cylinder 15 in the annular space surrounding the well 16, and is similarly provided with an outwardly flared mouth portion 19 for the reception of a plug-type valve. Guide struts 20 pivotally attached at their ends to lugs 21 and 22 secured, respectively, to the outer surface of the standpipe 13 and the inner wall surface of the chamber 11 serve to maintain the lower end of the standpipe 13 in axial alignment with the plug valve under all temperature conditions.

In the lower portion of chamber 11 a horizontal annular grid 23 is provided, suitably supported by a ring 24 attached to the chamber wall and a ring 25 attached to the outer surface of the cylinder 15, to support the dense phase mass of regenerated catalyst. A steam inlet 26 extends through the lower wall of the chamber 11 into the well and is connected at its inner end to a pipe distributor ring 27 from which steam is introduced into the well 16 to pass upwardly through the mass of catalyst descending into the well from the dense bed 14 of the regenerator for subsequent passage into the lower end of the carrier line 12. The customary dropout outlets 28 and 29 are provided in the bottom wall of the chamber, through which the well and the annular space around the well and below the grid may be drained.

To control the flow of spent catalyst into chamber 11 through standpipe 13, and out of the chamber after suitable regeneration through carrier line 12, plug-type valves 30 and 31, respectively, are provided. Valves 30 and 31 may be of substantially identical construction, except for slight modifications adapting the valve for its intended service. In its principal application, as at 31, the valve is intended for fluid injection into a powder transfer line concomitantly with flow control of the powder into the same, as exemplified by the internal catalyst carrier line 12 for conveying catalyst withdrawn from the lower regeneration chamber 11, in admixture with vaporous hydrocarbons injected through hollow removable injector head or plug 32 directly into the carrier line, to an upper reaction chamber, the catalyst being transferred continuously between dense fluidized masses in the lower portions of the chambers. The removeable injector head, or plug, is attached to the tubular section 38 of the valve stem, discussed hereinbelow, by a plurality of plug clamps and plug clamp bolts, 112 and 113, which engage respectively the flared end 114 of the tubular portion 38 of the stem valve and the integral projections 115 on the underside of the conical plug. The forward end of plug clamp bolt 112 abuts the flared end 114 of tubular portion 38, while the underside of the clamp 113 abuts the integral projection 115, thereby making a rigid connection. Like the removeable valve seat 18, the removeable plug 32 is also of a hardened material to resist erosion, but is easily replaceable as a small unit.

Valve 30 is generally similar to valve 31, except that it need not have a hollow stem. Valve 30 controls the flow of the spent catalyst through standpipe 13 connecting an upper reaction chamber with the lower regeneration chamber 11. The valve 30, however, is modified by substituting a replaceable solid plug head 33 for the hollow injector head 32, and by eliminating or blocking off the inlet nozzles which supply to the bonnet of the valve the fluid to be injected into the transfer line. If it is desired, however, to provide aeration gas to the standpipe 13, the hollow type injector head and the inlet nozzles may be retained to supply gas, such as steam, to the standpipe. Regardless of whether the valve is to be used for carrier line control or for standpipe control, or whether the valve is to be used as a combined plug valve and injector or solely as a plug valve, the basic construction illustrated in the drawings may be used. The slight changes necessary to adapt the basic valve structure for its particular use may readily be made at the place of manufacture or in the field with a minimum of cost, materials, and labor.

As a safety precaution to avoid injury to transfer lines 12 and 13 in the event that valves 30 and 31 are left in closed position while the temperature of the unit is substantially increased, as in starting up from cold condition, means are provided in conjunction with the external valve control mechanism to accommodate or relieve the severe stresses transmitted to the valve stems from the expanding transfer lines, and incidental stresses transmitted to the valve assembly as a result of expansion of the valve stem.

Valves 30 and 31 are unitary assemblies projecting through the bottom of the chamber 11 in axial alignment with their respective catalyst transfer lines 13 and 12, and are removably attached to the chamber wall so that they may readily be removed as a unit. For this purpose, flanged mounting nozzles 34 and 35 are provided in the bottom of the chamber 11 to receive the valve units 30 and 31, respectively. The entire valve mechanism is supported from nozzles 34 and 35 by the mounting flange 36 which forms a closure for the end of the mounting nozzle and is removably secured thereto in any conventional manner.

The valve assembly 31, shown in enlarged sections in Figures 2 to 8, comprises an elongated valve stem consisting of a tubular portion 38, having the injector head 32 secured to its upper end engageable with the mouth portion 18 of the carrier line, and a solid rod portion 39 connected to the lower end of the tubular section 38 through a spider 40 having openings 41 which provide free access to the hollow portion 38 of the valve stem. Spider 40 is secured, as by welding, to the lower end of hollow portion 38, and is removably joined to the upper end of solid portion 39 by the disc nut 42 threaded into the lower end of the spider. Inlet T 37, which may also be designated as a valve bonnet, forms a chamber into which the oil feed and, if desired, a steam and slurry mixture may be introduced through inlet nozzle 43 set in the side of the bonnet.

A cylindrical valve guide sleeve 45 projects upwardly from the mounting flange 36 into the chamber 11 to a point adjacent the lowermost position of the valve head 32 when the valve is fully retracted. Upper and lower guiding and sealing surfaces 46 and 47 are provided on the inner wall of the valve guide sleeve 45 separated by an annular space 48 between the guide sleeve and the hollow valve stem into which bleed steam may be introduced by steam line 49, the arrangement of which is clearly shown in Figure 2. The lower guide portion 47 is undercut a substantial distance from its upper end to provide an annular space 50 into which bleed steam may be introduced through line 49 without direct impingement in the hollow valve stem 38.

Due to the high temperature at which the valve operates, lubrication of the stem and guides is impossible. Moreover, means must be employed to exclude the catalyst in which the valve is immersed from the polished bearing surfaces. The need for lubrication is eliminated by providing adequate clearance between the stem and its guides and by using hard, polished materials. Catalyst is kept out of the valve by means of a bleed medium (usually steam or air, although other fluids can be used). This bleed medium performs an additional function in that it reduces to some extent the temperature of the guides and of the stem tube and keeps them both at nearly the same temperature.

To improve the operation of the valve, a stem bleed bushing 117 has been added to the end of the guide tube 45, as shown in Figures 3 and 4. It is to be noted that the annular clearance (dimension A) between its upper interior cylindrical surface and the valve stem is greater (by a small fraction of an inch) than the similar clearance (dimension B) between the stem and the guide bearing. The enlarged annular chamber in the lower part of the bleed bushing acts as a distribution space for the bleed medium.

The advantages obtained from the use of this bleed bushing are the following:

(1) A positive clearance is always present around the entire periphery of the stem for the passage of bleed medium. The stem may be in contact with the guide bearing on one side; nevertheless, a passage for bleed medium is still present at the end of the bleed bushing. This effectively prevents particles of catalyst from being trapped in the annulus, which would cause the stem and its bearing to be scored.

(2) The bleed medium is confined to the immediate vicinity of the stem for the entire length of the bushing. At the rates of stem travel employed it will require approximately a minute for the valve to travel this distance. The cooling effect of the bleed medium is thus greatly enhanced, which is of particular importance if the valve is moving in the opening (downward) direction. The stem tube, which has been immersed in the heated catalyst bed, is given time to cool under the influence of the bleed medium to the approximate temperature of the guide bearing, thus preserving the designed clearance and preventing sticking of the stem.

(3) The used of the bleed bushing gives greater design flexibility in controlling the amount of bleed medium. The diameter of the annulus and its length can be varied to regulate the flow, and if desired the guide bearing can be by-passed, leaving the bleed bushing as the only significant restriction to the flow.

The portion of valve guide sleeve 45 below the surface 47 forms with the inlet T and valve bonnet 37 a continuous inlet chamber within which the portion of the valve stem, including the spider 40, moves up and down between its upper and lower limits. Constant open communication for any position of the valve stem is thus provided between the hollow portion 38 of the valve stem and the chamber into which the oil feed is introduced through inlet 43.

A particular advantage of the arrangement thus far described is that the nozzle 43, connectable with an external feed line, not shown, is at all times in fixed position regardless of any movement of the valve stem, thus eliminating the need for the usual flexible coupling arrangements between the valve and the oil feed line.

The valve guide sleeve 45 extending upwardly from the flange 36 is provided with a cylindrical insulation casing 51 secured at its lower end to the upper face of the flange 36. The annular space between the casing 51 and the valve guide sleeve 45 is filled with a suitable insulation material 52. Embedded within the insulation material 52 is the steam bleed line 49, which extends downwardly through the insulation material before communicating with a radial inlet port 53 formed in the flange 36. The insulation material may suitably be applied to the valve unit at the point of manufacture.

At the lower end of chamber 37 a bonnet flange 54 is provided to seal the bonnet chamber. A conventional stuffing box 55 is provided in bonnet flange 54 to receive the solid portion 39 of the valve stem. A suitable lubricant fitting, not shown, is provided in the usual manner to lubricate the packed portion of the stuffing box 55. A support member, conveniently formed as a flanged yoke portion 71 having side openings 58 and 59, is removably attached to the underside of bottom flange 54, encircling the stuffing box 55 and a portion of the valve stem projecting downwardly therebelow. Stem holder guides 120, in the form of vertical ribs, form an integral part of the yoke member and permit the vertical movement of stem holder 121 while restraining its rotation. Stem holder 121 is conventionally attached to solid portion 39 of the valve stem as by a set screw, not shown, which prevents the rotation of the valve stem. A pointer 156 extending from the stem holder 121 indicates the position of the valve stem 39 relative to scale 157. Valve stem 39 has a threaded lower portion 122 adapted to fit within the internally threaded sleeve or stem nut 123 which is adapted to be rotated by a conventional gear type valve operator.

The valve operator mechanism is removably attached to the lower flange of the yoke member 71 and operates as a unit to reciprocate the valve stem as desired. Within the operator housing, a drive sleeve assembly bearing at roller bearings 134 at the top and roller bearings 135 at the bottom, rotates as a unitary assembly. The assembly includes collar 136 and indicator sleeve 137, hereinafter described, stem nut 123, described above, and compensating springs 124 within drive sleeve 125. The compensating springs 124 are maintained in a state of desired compression preload by the drive sleeve cover 126 carried at the lower end of the drive sleeve. Compensating springs 124 fit below the flanged portion of stem nut 123 and normally hold said stem nut in the position shown. Upon expansion of transfer line 12, when valve is in closed position, with consequent downward movement of tubular valve stem 38, and solid valve stem 39, stem nut 123 moves downwardly against the compression of compensating springs 124. Compensating springs 124 are designed to accommodate at least the maximum vertical movement which is expected due to thermal expansion within the temperature limitations of the process. The entire operating mechanism is enclosed within a suitable housing 127 upon which is externally mounted a suitable drive motor 128 and a hand wheel 129 for auxiliary manual operation. Conventional drive mechanisms from the motor or from the hand wheel terminate in clutch collar 130 splined to the external surface of drive sleeve 131, which in turn is splined at its inner surface to the external surface of stem nut 123. Drive sleeve 131 and stem nut 123 rotate with clutch mechanism 130 about the threaded portion 122 of the valve stem and thereby actuate its vertical movement. The motor 128 is regulated by impulses from a conventional positioner mechanism 155 adapted to be controlled by automatic sensory devices in accordance with desired process requirements, and to which the position of the valve stem is indicated by the height on the positioner tape 159 of the adjustable stem clamp 158 which is attached to stem holder 121.

In order to provide for alternative or auxiliary manual operation of the valve, hand wheel 129 is provided. Rotation of hand wheel 129 rotates hand wheel bevel pinion 139 which is adapted to engage the bevel gear teeth 138 which are an integral portion of clutch collar 130. Clutch collar 130 is adapted by standard mechanical means not shown, to be lowered out of engagement with the drive mechanism of the motor and into engagement with the hand wheel bevel pinion by means of clutch lever 140. Rotation of the hand wheel when the clutch collar is in this latter position results in rotation of the collar, which, as stated above, is splined to the external surface of drive sleeve 131 and, therefore, rotates the drive sleeve. Due to the larger gear ratios involved, it is possible, after having moved the valve into closed position, to continue the rotation of stem nut 123 and thereby compress the compensating springs 124. If this compression of the compensating springs should exceed a predetermined amount, there may be insufficient accommodation for the thermal expansion, and serious damage to the valve may result therefrom. In order to guard against this occurrence, use is made of a compensating indicator mechanism including indicator sleeve 137 and collar 136, which form an integral portion of stem nut 123, and which, by their position, indicate the degree of compression of compensating springs 124.

In certain operations, and particularly in hydroforming operations, it may be desirable to utilize the control valve of this invention as a valve for complete closure between the process zones. For such operation it is necessary to provide not only for the expansion of transfer line 12 and standpipe 13 with increasing temperature, but also for the maintenance of closure during their contraction.

An enlarged detail of a combined warning and closure mechanism is shown in Figures 6 to 8, in which collar 136 and indicator sleeve 137 are represented as before and in which rollers 142 are an integral part of cam block 143 adapted to move vertically with collar 136 while permitting rotation of the collar. Cam block 143 fits over columns 144 and is free to slide vertically thereon. Cam follower 145 is adapted to engage the surface of cam block 143 and to be actuated thereby. It consists of two parts, the first an actuating lever 145, and the second a gear sector 146. The two portions are rigidly but adjustably held together by a nut and screw. The lower portion of actuating lever 145 is adapted to activate any conventional signal device. In Figure 8, the actuating lever is shown in contact with button 147 of control mechanism 148 which starts and stops motor 128 in response to the movement of the button 147. Control mechanism 148 may comprise an electrical circuit, normally closed, and opened by pushing of the button 147, or it may comprise a pneumatic system, normally open, and closed by the pushing of the button 147. Thus, in an electrical control mechanism, when the valve has been closed and spring 124 is in a relatively high state of compression so that collar 136 is at a low point and button 147 is in, the circuit will be open and the motor will not operate. Upon contraction of the valve stem and decompression of spring 124, collar 136 rises and button 147 comes out, thus closing the circuit, and starting up the motor which closes the valve and brings the spring 124 to the desired degree of compression. Similarly, in the pneumatic system, the contraction of the valve stem and decompression of the spring raises the collar and permits button 147 to come out, thereby opening the pneumatic system which actuates the starting of the motor.

For the warning mechanism, gear sector 146 engages the teeth of pinion gear 149 in such a way that a slight downward movement of the compensating springs beyond a designated point drops a signal flag 160. Upon release of the compression and elevation of collar 136, the gear sector 146 is actuated in a reverse direction and serves to retract the signal flag.

An additional warning mechanism, not shown, using a sound signal, such as a whistle or a bell, may also be employed. This additional warning mechanism may be actuated by a button similar to button 147, but serving to open a whistle to high pressure air, or serving to close a circuit which includes an electric bell.

Mounted on cam block 143 and moving therewith is an indicating pointer 150 which moves relative to a stationary scale 151 and thereby indicates the degree of compression of the compensating springs 124.

Although the control valve of this invention has been described with particular reference to a fluid catalytic cracking unit or a fluid catalytic hydroforming unit, it is to be noted that the valve is applicable to any fluidized system involving two or more superimposed contact chambers with transfer of finely-divided fluidized solids between the chambers. This invention permits a control valve to be used as a closure valve, and thereby permits substantial reduction of construction costs and operating expense.

I claim:

1. A valve for controlling fluid flow between a chamber and the free end of an elongated internal conduit extending downwardly therein and for effecting complete closure between said chamber and said internal conduit, comprising a plug-type closure member seatable in the open end of said conduit, and movable in a vertical path below said conduit, to vary the free path of said fluid between said closure member and said open end of said conduit, an elongated valve stem secured to said closure member, motor means connected to said valve stem for moving the stem along said vertical path, yieldable spring means adapted to accommodate by compression any increase in the length of said valve stem and internal conduit when said closure member is seated against said open end of said conduit, and means responsive to the degree of compression of said yieldable spring means to actuate said motor means to move said stem along said path to maintain said valve in closed position.

2. In a fluidized solids conversion system wherein solids are transmitted from a lower contacting zone to an upper contacting zone through a vertical conduit, wherein the flow of solids through said vertical conduit is controlled by the vertical movement of a plug-type closure member, seatable in the lower open end of said conduit, and operated through an elongated valve stem by a motor, and wherein the effects of the thermal expansion of said conduit and said valve stem are compensated by the compression of a spring member; an apparatus for obtaining complete closure between contacting zones which comprises a normally closed electrical circuit to operate said motor and means connected to said spring means to open said circuit upon the compression of said spring means beyond a predetermined state and to reclose said electrical circuit upon the decompression of said spring means to said predetermined state.

3. In a fluidized solids conversion system wherein solids are transmitted from a lower contacting zone to an upper contacting zone through a vertical conduit, wherein the flow of solids through said vertical conduit is controlled by the vertical movement of a plug-type closure member, seatable in the lower open end of said conduit, and operated through an elongated valve stem by a motor, and wherein the effects of the thermal expansion of said conduit and said valve stem are compensated by the compression of a spring member; an apparatus for obtaining complete closure between contacting zones which comprises a normally open pneumatic system to operate said motor and means connected to said spring means to close said pneumatic system upon the compression of said spring means beyond a predetermined state, and to reopen said pneutmatic system upon the decompression of said spring means to said predetermined state.

4. The apparatus of claim 1, wherein said valve stem is moved by said motor means by a threaded stem nut, coaxial with said valve stem and meshing with and rotating about a threaded portion thereof, and a drive sleeve coaxial with said stem nut and splined thereto.

5. The apparatus of claim 1, wherein said means responsive to the degree of compression includes a threaded stem nut bearing on said yieldable spring means, coaxial with said valve stem and meshing with and free to rotate about a threaded portion thereof, and an indicator sleeve bearing on said stem nut and rotating therewith while free to move vertically with respect to said valve stem.

6. The apparatus of claim 5, wherein a cam block, free to move in a vertical direction, is adapted to move with said indicator sleeve and to transmit the motion of the indicator sleeve to a control mechanism which activates said motor means.

7. The apparatus of claim 2, wherein said valve stem is moved by said motor means by a threaded stem nut, coaxial with said valve stem and meshing with and rotating about a threaded portion thereof, and a drive sleeve coaxial with said stem nut and splined thereto.

8. The apparatus of claim 2, wherein said means responsive to the degree of compression includes a threaded stem nut bearing on said yieldable spring means, coaxial with said valve stem and meshing with and free to rotate about a threaded portion thereof, and an indicator sleeve bearing on said stem nut and rotating therewith while free to move vertically with respect to said valve stem.

9. The apparatus of claim 8, wherein a cam block, free to move in a vertical direction, is adapted to move with said indicator sleeve and to transmit the motion of the indicator sleeve to a control mechanism which activates said motor means.

10. The apparatus of claim 3, wherein said valve stem is moved by said motor means by a threaded stem nut, coaxial with said valve stem and meshing with and rotating about a threaded portion thereof, and a drive sleeve coaxial with said stem nut and splined thereto.

11. The apparatus of claim 3, wherein said means responsive to the degree of compression includes a threaded stem nut bearing on said yieldable spring means, coaxial with said valve stem and meshing with and free to rotate about a threaded portion thereof, and an indicator sleeve bearing on said stem nut and rotating therewith while free to move vertically with respect to said valve stem.

12. The apparatus of claim 11, wherein a cam block, free to move in a vertical direction, is adapted to move with said indicator sleeve and to transmit the motion of the indicator sleeve to a control mechanism which activates said motor means.

References Cited in the file of this patent

UNITED STATES PATENTS

| | | |
|---|---|---|
| 2,028,696 | Beckwith | Jan. 21, 1936 |
| 2,601,578 | Witt | June 24, 1952 |
| 2,668,755 | Kershaw et al. | Feb. 9, 1954 |
| 2,681,871 | Wallace | June 22, 1954 |
| 2,733,041 | Crookson | Jan. 31, 1956 |